(12) United States Patent
Backa

(10) Patent No.: US 8,386,439 B2
(45) Date of Patent: Feb. 26, 2013

(54) SYSTEM AND METHOD FOR USER-DRIVEN DATA ARCHIVING

(76) Inventor: Bruce Backa, Incline Village, NV (US)

( * ) Notice: Subject to any disclaimer, the term of this patent is extended or adjusted under 35 U.S.C. 154(b) by 337 days.

(21) Appl. No.: 12/608,481

(22) Filed: Oct. 29, 2009

(65) Prior Publication Data

US 2010/0106690 A1 Apr. 29, 2010

Related U.S. Application Data

(60) Provisional application No. 61/109,370, filed on Oct. 29, 2008, provisional application No. 61/109,376, filed on Oct. 29, 2008.

(51) Int. Cl.
*G06F 17/00* (2006.01)
(52) U.S. Cl. ............... 707/671; 707/737; 711/161
(58) Field of Classification Search .............. 711/161; 707/671, 737
See application file for complete search history.

(56) References Cited

U.S. PATENT DOCUMENTS

2004/0002989 A1* 1/2004 Kaminer ............... 707/102
2008/0313364 A1* 12/2008 Flynn et al. ............ 710/31

* cited by examiner

*Primary Examiner* — Belix M Ortiz Ditren
(74) *Attorney, Agent, or Firm* — Sampson & Associates, P.C.

(57) ABSTRACT

A system and method for providing cost-effective user-driven data archiving. An end-user utilizes a file selection for data archiving application to select certain specific files and/or file folders to be archived. The file selection for data archiving application invokes a translation software engine to translate the intended actions into instructions specific for a particular data archiving product in order for that application to archive the selected file(s)/folder(s) as intended by the user. In this manner, the user interface can be optimized for those purposes while the archiving application can by optimized for its purposes without regard to ease of use of the user interface.

28 Claims, 1 Drawing Sheet

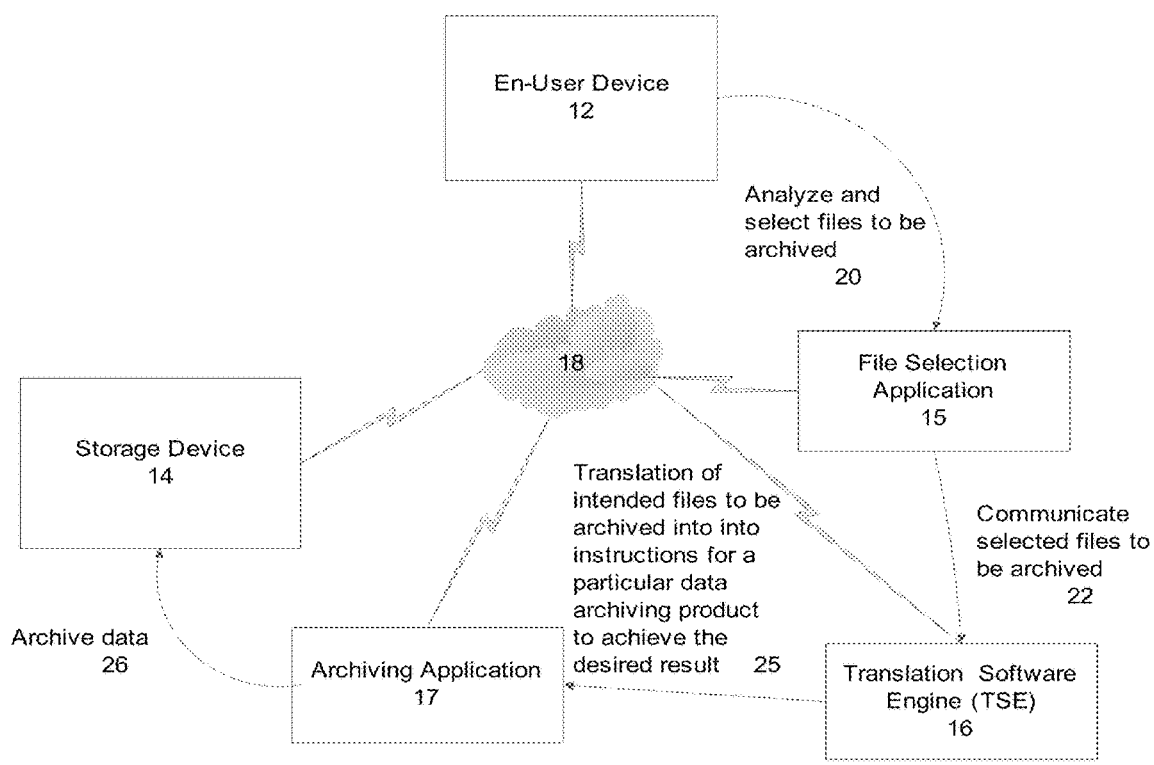

SYSTEM AND METHOD FOR USER-DRIVEN DATA ARCHIVING

CROSS-REFERENCE TO RELATED APPLICATIONS

This application claims the benefit of U.S. Provisional Application Ser. No. 61/109,370 entitled "System and Method for User-Driven Archiving" filed on Oct. 29, 2008, and U.S. Provisional Application Ser. No. 61/109,376 entitled "System and Method for Policy-Based Data Archiving Triggered by User Activity" filed on Oct. 29, 2008 both incorporated herein fully by reference.

TECHNICAL FIELD

The present invention relates to data archiving and more particularly, to a cost-effective system and method for user-driven data archiving.

BACKGROUND INFORMATION

It is important for companies to find cost effective ways to manage their digital file storage. Although it may seem that file storage is inexpensive, 80% or more of the total cost of ownership is in managing and administering that storage. Most organizations' need for file storage is growing at 40% to 50% per year, along with the cost to manage that storage. Many companies attempt to manage costs by having various tiers of storage, with different costs for each of these tiers. Along with this, most take the simplistic and costly approach of moving data solely based on when it was last used: "archive everything over x days old" from the higher cost primary storage tiers to the lower cost archival storage tiers.

But even this approach results in much greater costs than necessary as the data movement is not directly tied to storage policies, applicable rules, and the related actions that should be taken when specific user activity occurs. Instead, the entire file system is scanned week after week or month after month, with little result after the first such scan has been run. (If the data wasn't unused for 2 years at the last scan, the odds that has now become so are very small.)

In addition, it does not get those involved who can determine what should be archived and what should remain the same vs. what can be eliminated (i.e. deleted).

Two critical components are needed to implement truly cost effective data storage archive management—automation and the participation of end-users. Letting the users and creators of the data make decisions based on the business value of the document and future needs, while simultaneously completely eliminating unwanted/unneeded files greatly saves costs. This is because end-users are the best ones who know what should be archived or eliminated, vs. a mindless, broad based "archive everything over x days" approach. However, getting the end users to do participate in file management is difficult given the demands already placed on their time.

A number of storage software vendors provide solutions that will archive data. However they are based on the IT department configuring an archiving application to look for files over "x" days old and archive the resulting data. Then in order for the now configured archive solution to do its job, it must scan the entire primary storage device looking for files that meet the configuration profile established by the IT Department. This is a very "blunt instrument" approach. It is not user-driven and operates irrespective of the business value of the documents. These solutions do not involve users, who are the ones to know best what future value particular files may have.

Accordingly, what is needed is a cost-effective system and method for user-driven data archiving.

SUMMARY

The invention includes the following components: an application that allows end-users to select files for archiving; a mechanism to translate the intended action into a set of instructions for a particular data archiving product; and a mechanism to satisfy the requirements of network security and convey the instructions to the data archiving product.

BRIEF DESCRIPTION OF THE DRAWINGS

These and other features and advantages of the present invention will be better understood by reading the following detailed description, taken together with the drawings wherein:

FIG. 1 is block diagram of a system implementing the system and method of the present invention.

DETAILED DESCRIPTION OF THE PREFERRED EMBODIMENTS

The present invention will be explained in connection with an exemplary system 10, FIG. 1, including an end-user device 12, such as a computer, laptop, PDA, Smart phone or the like. End-user device 12 is meant to encompass a workstation, personal computer, personal digital assistant (PDA), wireless telephone, or any other suitable computing device including a processor, a computer readable medium upon which computer readable program code (including instructions and/or data) may be disposed, and a user interface, all of which require or could benefit from primary and archiving storage.

Each end-user device is coupled to a storage device 14 that is used for primary (day to day) storage, and that may also be used for long term storage or archiving. The primary storage and long-term or archiving storage may be performed on two different areas of the same physical storage device 14 or alternatively, may be performed on two physically different and/or remotely located storage devices 14.

Storage device 14 may include any number of storage devices, including, but not limited to, Network Attached Storage (NAS) such as those available from EMC Corporation (Hopkinton, Mass., USA) and NetApp (Sunnyvale, Calif., USA), Storage Area Network (SAN) devices such as, but not limited to, those from EMC Corporation (Hopkinton, Mass., USA), and direct attached storage devices (DAS) such as, but not limited to, devices running the Microsoft Windows Server operating system.

Also provided is a translation software engine (TSE) 16 (sometimes referred to as a user-driven archiving software engine (UDA)). The TSE 16 is located on a server that may perform other functions and may provide other features to the network such as hosting a database. The primary purpose of the TSE 16 is to serve as an intermediary between the file selection application 15 and the archiving application 17. The TSE 16 receives archiving commands from the file selection application 15 and using lookup tables, database, hard coded programming, configuration files or the like, and translates those commands into instructions or commands specific to the predetermined specific archiving application 17 in use at this particular site. Archiving application 17 may reside on an archiving application server that is separate from TSE 16, or alternatively, archiving application 17 and TSE 16 may reside on the same server.

The file archiving application 17 may be a standard off the shelf application. A non-limiting example of an archiving application suitable for use in connection with the present invention includes the Symantec Enterprise Vault archiving application (Symantec Corporation, Cupertino Calif., USA) although other archiving application software/devices are considered to be within the scope of the present invention.

The file selection for archiving application 15 is a software application, such as NTP Software Storage Investigator™ available from NTP Software (Nashua N.H.) and incorporated herein by reference, that allows users to designate specific files or categories of files for archiving. The file selection application 15 may reside directly on the end-user device 12 or on another server or platform.

Archiving application 17 may reside on an archiving application server that is separate from TSE 16, or alternatively, archiving application 17 and TSE 16 may reside on the same server.

The end-user device 12, storage device 14, and the server that holds the TSE 16, are coupled together over a local or wide area network by means of a network communication path 18. The end-user device 12 may be any form of computing or data processing device requiring or benefiting from access to data stored on a storage device 14.

Terms such as "server", "application", "engine" and the like are intended to refer to a computer-related component, including hardware, software, and/or software in execution. For example, an engine may be, but is not limited to being, a process running on a processor, a processor including an object, an executable, a thread of execution, a program, and a computer. Moreover, the various components may be localized on one computer and/or distributed between two or more computers.

In various embodiments, the end-user device 12 may be any form of computing or data processing device requiring or benefiting from access to data stored on the storage device 14. The File Selection Application 15 may reside directly on the end-user device 12. The file selection application 15 may take various forms including, but not limited to, a standard web browser based application that works with web browsers such as, but not limited to, Microsoft Internet Explorer (IE) and Mozilla Firefox.

The TSE 16 is an application configured to effectively translate actions taken at the File Selection Application 15 into instructions, usable by a particular archiving application 17. TSE 16 may also handle appropriate security requirements, e.g., to ensure that the particular user at device 12 has requisite permissions, etc.

One example of the TSE 16 includes the NTP Software ODA™ engine commercially available from NTP Software, Inc. (Nashua, N.H., USA) and incorporated herein by reference. TSE 16 may be located on a server that may perform other functions and provide other features to the network.

The end-user takes action 20 to select files and/or to be archived by utilizing that feature in the file selection for archiving application 15 which may or may not be running on the user's device 12. This application 15 issues a notification 22 to the TSE 16 of what files and/or folder(s) have been selected by the user for archiving. Thereafter, the TSE 16 translates the intended actions into instructions 25 for a particular archiving application 17 to archive data 26 based on files selected by the end-user.

An example of user-driven archiving in accordance with the present invention is that of an end-user who is using a file selection application 15 to select "big.doc", and "waste.xls", to be archived from the "user1" folder on their primary storage device 14. Knowing what files the user has selected based on communication from the File Selection Application 15, the TSE 16 translates the desired result (archive files "big.doc" and "waste.xls") into commands specific to the archiving application 17 to archive only the files the user selected ("big.doc" and "waste.xls" in this example). These instructions for the archiving application may be created substantially in real-time (e.g., on-demand), or may be created and/or executed at a later time.

One skilled in the art should recognize, in light of the present disclosure, that the particular archiving instructions generated by TSE 16 will be tailored to the capabilities and command set of the particular archiving application 17, in combination with the particular files selected using the File Selection Application 15, so as to achieve the desired archiving results as close as practical, within the limitations of the archiving application 17.

In this manner, the present invention can interface with and can be programmed to interface with essentially any archiving application that will allow it's command set/command interface to be made known to third parties for interfacing with that archiving application.

In this regard, in some embodiments, archiving application 17 may enable individual files to be archived directly, e.g., by name, while other archiving applications 17 may require an indirect approach including a more complex series of instructions configured to filter out substantially all but the selected file(s) (for example, instructions to not archive files that do not have a .doc extension or to archive only files that begin with a name of "big" and have a .doc extension.

Accordingly and in summary, to enable user-driven data archiving, in particular representative embodiments, the following components are needed:
- an application that allows end-users to select files for archiving, such as file selection application 15; and
- a mechanism to satisfy the requirements of network security and to translate the intended action into a set of instructions for a particular data archiving product, such as the translation software engine 16.

Utilizing the system and method of the present invention, the particular archiving software and its user interface (or perhaps lack thereof) is decoupled or distanced from the user in that the user interfaces only with the file selection application 15, whose interface and file selection for archiving features and function can be designed and optimized from the user perspective and not from the perspective of the file archiving performance requirements of the file archiving software 17.

Modifications and substitutions by one of ordinary skill in the art are considered to be within the scope of the present invention, which is not to be limited except by any allowed claims and their legal equivalents.

What is claimed is:

1. A user activity based data archiving system, comprising:
   a user archiving request device including a user interface, said user interface configured for allowing a user to select one or more files or file folders to be archived from the user's primary storage device, and responsive to a user selecting said one or more files or file folders to be archived, for providing an indication of said selection, said indication including a listing of said one or more files or file folders to be archived;
   an archiving translation device running on a device other than the storage device, coupled to said user archiving request device and to an archiving control device, and responsive to said indication from said user archiving request device including a listing of said one or more files or file folders to be archived, for providing to said archiving control device one or more specific commands understandable by said archiving control device, said one or more specific commands including specific instructions which will cause said archiving control device to archive said one or more files or file folders selected by said user; and wherein said user archiving request device and said archiving translation device are configured to operate independently of any relational databases.

2. A user activity based data archiving system, comprising:
a user archiving request device being communicably couplable to an end user's storage device;
said user archiving request device including a user interface configured for allowing a user to select one or more files or file folders to be archived from the user's storage device;
said user archiving request device configured for being responsive to a user selecting said one or more files or file folders to be archived, and for providing an indication of said selection;
said user archiving request device being further configured for being communicably coupled to an archiving translation device running on a device other than the storage device;
wherein the indication is configured to be usable by the archiving translation device to identify the one or more files to be archived and to generate instructions usable by an archiving control device; and
wherein said user archiving request device and said archiving translation device are configured to operate independently of any relational databases.

3. The user activity based data archiving system of claim 2, further comprising the archiving translation device, coupled to said user archiving request device and couplable to the archiving control device;
the archiving translation device configured for being responsive to said indication from said user archiving request device, for providing to the archiving control device one or more specific commands understandable by the archiving control device, said one or more specific commands including specific instructions which will cause the archiving control device to archive said one or more files or file folders selected by said user.

4. The user activity based data archiving system of claim 3, wherein said indication is configured to include a listing of said one or more files or file folders to be archived.

5. The policy based data archiving system of claim 3, wherein the archiving translation device is further configured to satisfy requirements of network security.

6. The user activity based data archiving system of claim 3, comprising the archiving control device communicably coupled to the archiving translation device.

7. The policy based data archiving system of claim 6, wherein the archiving control device comprises an archiving application.

8. The policy based data archiving system of claim 7, wherein the archiving application comprises a Symantec Enterprise Vault archiving application.

9. The policy based data archiving system of claim 3, comprising the storage device.

10. The policy based data archiving system of claim 9, wherein the storage device comprises a Network Attached Storage (NAS) device.

11. The policy based data archiving system of claim 9, wherein the storage device comprises a Storage Area Network (SAN) device.

12. The policy based data archiving system of claim 9, wherein the storage device comprises a direct attached storage (DAS) device.

13. A method for user activity based data archiving, comprising:
(a) configuring a user archiving request device to be communicably couplable to an end user's storage device, and to include a user interface configured for allowing a user to select one or more files or file folders to be archived from the user's storage device;
(b) configuring the user archiving request device for being responsive to a user selecting the one or more files or file folders to be archived, and for providing an indication of the selection;
(c) configuring the user archiving request device for being communicably couplable to an archiving translation device running on a device other than the storage device;
(d) configuring the indication to be usable by the archiving translation device to identify the one or more files to be archived and to generate instructions usable by an archiving control device; and
(e) configuring said user archiving request device and said archiving translation device to operate independently of any relational databases.

14. The method of claim 13, comprising:
(e) configuring the archiving translation device for being couplable to the user archiving request device and for being couplable to the archiving control device;
(f) configuring the archiving translation device for being responsive to the indication from the user archiving request device, for providing to the archiving control device one or more specific commands understandable by the archiving control device, the one or more specific commands including specific instructions which will cause the archiving control device to archive said one or more files or file folders selected by said user.

15. The method of claim 14, further comprising configuring the indication to include a listing of the one or more files or file folders to be archived.

16. The method of claim 14, further comprising configuring the archiving translation device to satisfy requirements of network security.

17. A method for user activity based data archiving, comprising:
(a) communicably coupling a user archiving request device to an end user's storage device, the user archiving request device including a user interface configured for allowing a user to select one or more files or file folders to be archived from the user's storage device;
(b) selecting, with the user interface, one or more file or file folders from the user's storage device, wherein the user archiving request device provides an indication of the selection;
(c) communicably coupling the user archiving request device to an archiving translation device running on a device other than the storage device and operating independently of any relational databases, wherein the indication is usable by the archiving translation device to identify the one or more files to be archived and to generate instructions usable by an archiving control device.

18. The method of claim 17, comprising:
(d) communicably coupling the archiving translation device to the user archiving request device and to the archiving control device, wherein the archiving translation device is responsive to the indication from the user archiving request device, to provide to the archiving control device one or more specific commands understandable by the archiving control device, the one or more specific commands including specific instructions which will cause the archiving control device to archive said one or more files or file folders selected by said user.

19. The method of claim 18, wherein said communicably coupling (d) comprises communicably coupling the archiving translation device to an archiving control device including an archiving application.

20. The policy based data archiving system of claim 19, wherein said communicably coupling (d) comprises communicably coupling the archiving translation device to an archiving control device including a Symantec Enterprise Vault archiving application.

21. The method of claim 18, comprising communicably coupling the archiving control device to the storage device.

22. The policy based data archiving system of claim 21, comprising communicably coupling the archiving control device to the storage device including a Network Attached Storage (NAS) device.

23. The policy based data archiving system of claim 21, comprising communicably coupling the archiving control device to a storage device including a Storage Area Network (SAN) device.

24. The policy based data archiving system of claim 21, comprising communicably coupling the archiving control device to a storage device including a direct attached storage (DAS) device.

25. The system of claim 2, further comprising the archiving translation device running on a device other than the storage device.

26. The system of claim 25, further comprising the archiving translation device running on a device other than the archiving control device.

27. The system of claim 25, further comprising the archiving control device running on a device other than the storage device.

28. The system of claim 2, further comprising the archiving control device running on a device other than the storage device.

* * * * *